United States Patent
Chu-Chia et al.

(10) Patent No.: US 6,646,873 B2
(45) Date of Patent: Nov. 11, 2003

(54) PERSONAL DIGITAL ASSISTANT FOR CONNECTING WITH A COMMUNTCATIONS MODULE

(75) Inventors: Tsai Chu-Chia, Taipei Hsien (TW); Cheng-Hsin Sung, Taipei Hsien (TW)

(73) Assignees: Wistron Corporation, Hsi-Chih (TW); Acer Incorporated, Hsi-Chih (TW)

( * ) Notice: Subject to any disclaimer, the term of this patent is extended or adjusted under 35 U.S.C. 154(b) by 20 days.

(21) Appl. No.: 10/063,162
(22) Filed: Mar. 27, 2002
(65) Prior Publication Data
US 2002/0142799 A1 Oct. 3, 2002

(51) Int. Cl.$^7$ ................................................. H05K 5/00
(52) U.S. Cl. .................... 361/686; 312/223.2; 439/217; 400/692; 361/681
(58) Field of Search ................................ 361/683–687, 361/724–727; 312/223.1–223.6; 439/217–218, 929; 400/692–693

(56) References Cited

U.S. PATENT DOCUMENTS

| | | | |
|---|---|---|---|
| 6,270,271 B1 * | 8/2001 | Fujiwara | 400/693 |
| 6,283,777 B1 * | 9/2001 | Canova et al. | 439/218 |
| 6,388,877 B1 * | 5/2002 | Canova, Jr. et al. | 361/686 |
| 6,445,574 B1 * | 9/2002 | Saw et al. | 361/681 |

* cited by examiner

Primary Examiner—Darren Schuberg
Assistant Examiner—Hung Van Duong
(74) Attorney, Agent, or Firm—Winston Hsu

(57) ABSTRACT

A PDA for connecting with selectively installed communications modules. Both communications modules have their own corresponding connector and fixing device connected electrically and mechanically between the PDA and the communications module. With the above modules, the PDA becomes a tool with extendable specific communication functions. The communications module can be either a GPS or a cellular phone handset's communications module. They can be attached to a PDA to provide additional communication functions.

17 Claims, 12 Drawing Sheets

PERSONAL DIGITAL ASSISTANT FOR CONNECTING WITH A COMMUNTCATIONS MODULE

BACKGROUND OF INVENTION

1. Field of the Invention

The present invention relates to a PDA (personal digital assistant), and more particularly, to a PDA for selectively connecting to a communications module so as to provide some specific communication function.

2. Description of the Prior Art

A PDA (personal digital assistant) has not only a suitable size for carrying and an adequate memory and operating ability, but also a large enough LCD (liquid crystal display) panel to permit easy viewing. A Palm Series, whose memory size ranges from 8 MB to 32 MB and offers a color or black-and-white LCD panel, occupies the lion's share of the market. The standby time of the Palm Series can last up to one week. The Palm Series also provides a connecting cable that is used for digital data interchange between the PDA and a PC (personal computer). However, the PDA has two drawbacks. The first one is the lack of extend-ability for peripheral equipment; the second is a short range of use due to the lack of communication ability with a PC or mainframe.

A GPS (global positioning system) and a cellular phone are the top products in the portable electrical device field with high communication abilities. A mainframes GPS address is set through its antenna by transmitting and receiving signals to a specific satellite. Surface features will not affect the GPS efficiency as long as the angle of its antenna is set to a specified point of a certain satellite. The cellular phone handset has become the most popular portable electrical device because of an increasing base number and a significant drop in equipment cost. Although a wireless network WAP is gradually replacing existing handsets, an effort to develop the cellular phones digital data capabilities is significantly limited due to insufficient memory and operating ability and too small of an LCD panel.

SUMMARY OF INVENTION

It is therefore a primary objective of the claimed invention to provide a PDA for connecting with a communications module to solve the above-mentioned problems.

According to the claimed invention, three combinations of a PDA and a communications module have been disclosed. The first one is a PDA for connecting with a communications module. The PDA includes a first housing, an LCD panel formed on a first side of the first housing for displaying data, a first engaging means formed on a second side of the first housing, and a first connector disposed at one end of the first housing for transmitting power and data. The communications module includes a second housing, a second engaging means formed on the second housing for engaging with the first engaging means, and a second connector disposed at one end of the second housing for connecting with the first connector to transmit data.

It is an advantage of the claimed invention that a PDA that can connect with a communications module extends the PDA's communication ability.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
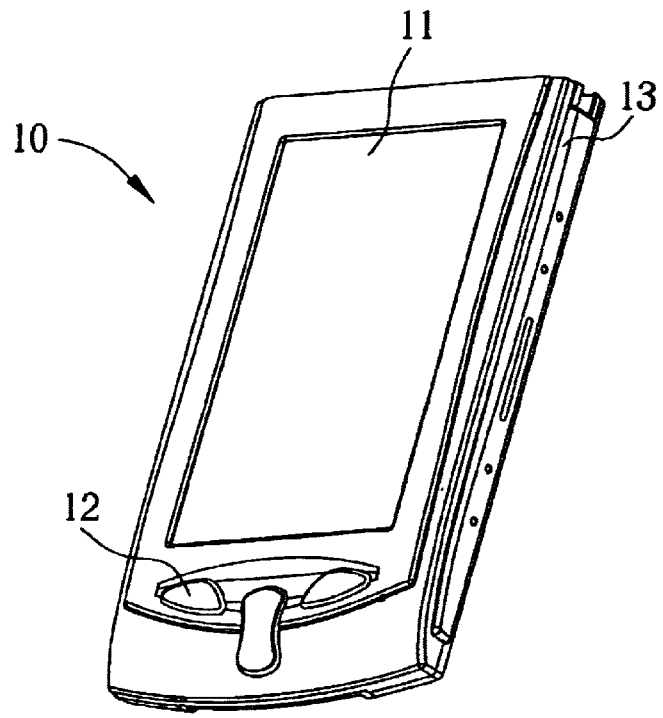
FIG. 1 is a three-dimensional drawing of a PDA according to the present invention.
Figure 1A:
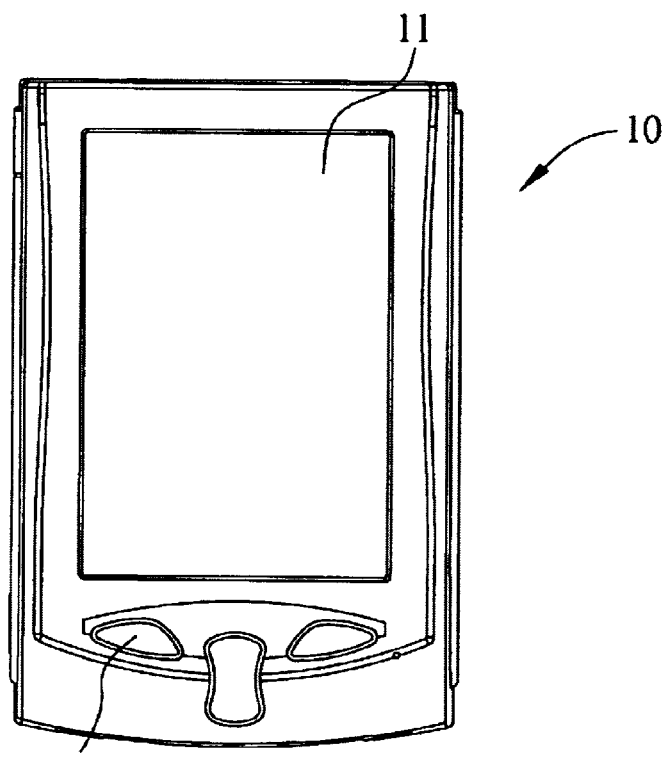
FIG. 1a is a front view of the PDA of FIG. 1.
Figure 1B:
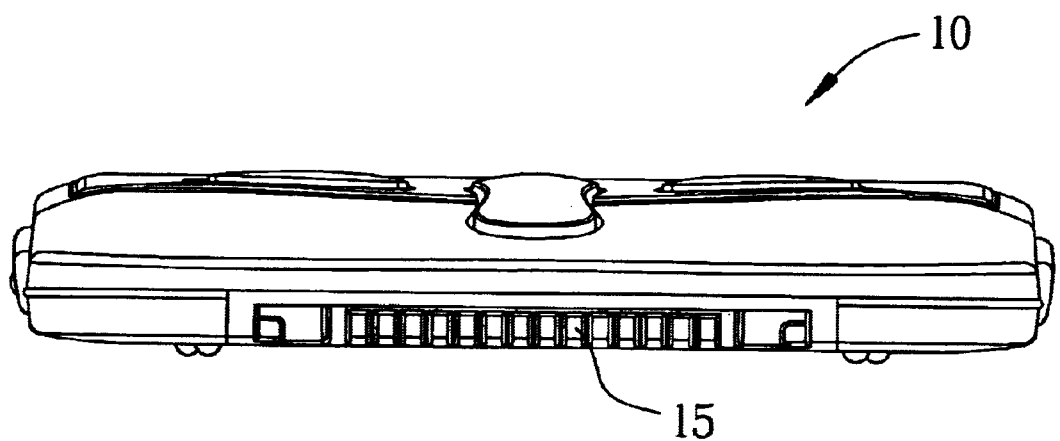
FIG. 1b is a top view of the PDA of FIG. 1.
Figure 1C:
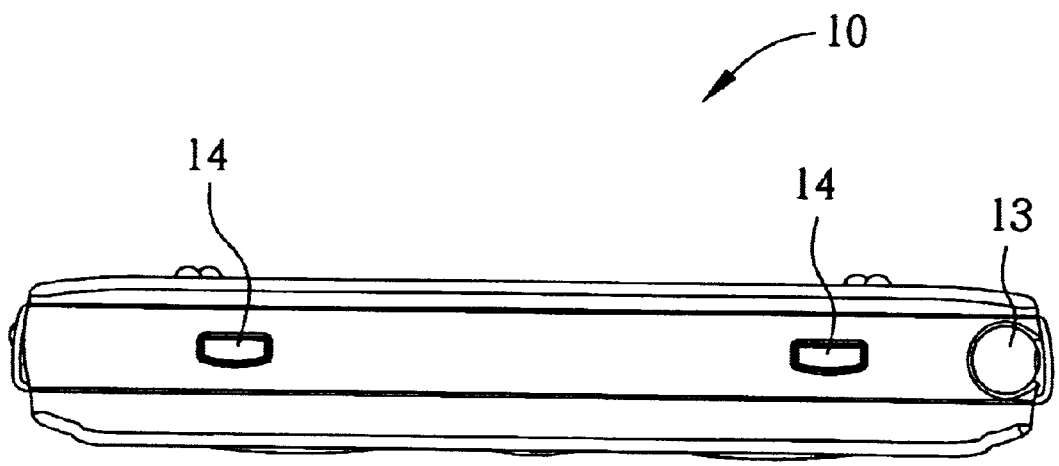
FIG. 1c is a bottom view of the PDA of FIG. 1.
Figure 1E:
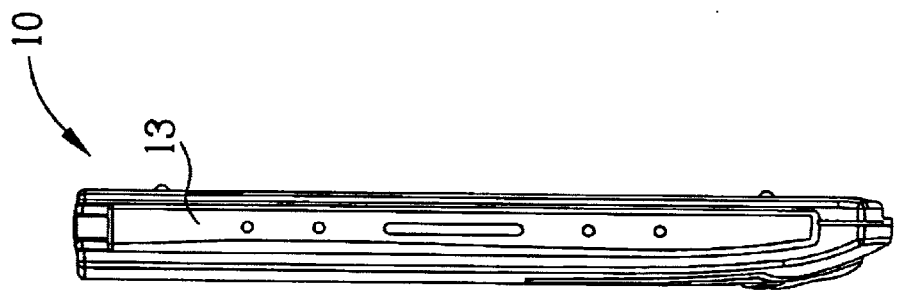
FIG. 1e is a right-hand-side view of the PDA of FIG. 1.
Figure 1D:
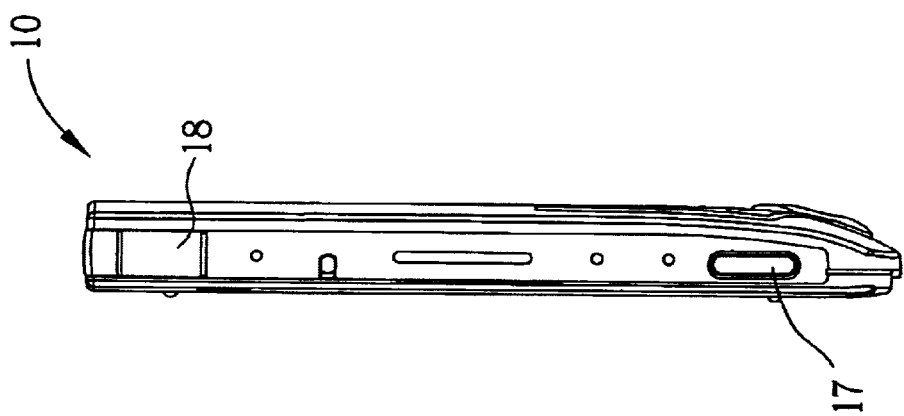
FIG. 1d is a left-hand-side view of the PDA of FIG. 1.

Please refer to FIG. 1 for an illustration of a PDA 10, which is a portable digital electrical device that includes memory, a display device, and an operating processor. The data, which is usually input by touching the panel with a handpen, is transformed into digital form and stored in memory. The PDA 10 has a wide application and generally serves as an electrical book, an electrical notebook, or an electrical business card album. Of course, the PDA 10 can interchange data with another PDA or PC by a wire or a wireless transmission port. As shown in FIG. 1, the PDA 10 comprises an LCD (liquid crystal display) panel 11, operating buttons 12, a handpen slot 13, a switch 17, and an infrared transmitter 18. The LCD panel 11 occupies as large of an area as possible to better display results. Disposed on the same side of the PDA 10 as the LCD panel 11, several operating buttons 12 provide specific auxiliary operations, such as paging, executing a program, and cursor movement. The handpen (not shown) is the most important input device. Therefore, there is a handpen slot 13 disposed on one side of the PDA 10 and is used for the safekeeping of the handpen when not in use. The switch 17 is used to execute the PDA's 10 "TURN ON" or "TURN OFF" action. The infrared transmitter 18 provides a wireless transmission function.

The PDA 10, of course, can be assembled with other built-in transmission modules, such as a bluetooth chip module or an IEEE 802.11 module.

Please refer to FIG. 1 again. The PDA 10 also comprises a pair of engaging slots 14, a first connector 15, and a pair of protrusions 16, all formed on the bottom reverse side of the LCD panel 11. In general application, the first connector 15 possesses 14 holes and serves as a power and data transmitter. The present invention also utilizes the first connector 15 to connect with a communications module.

There are two embodiments for the communications module according to the present invention. The first one is a GPS (global positioning system) module 20, shown in FIG. 2. The second one is a cellular phone module 30, shown in FIG. 3. Only one communications module can be connected to the PDA 10 at a time. That is to say, the PDA can only perform one single communication function within a certain operating period.

Figure 2:
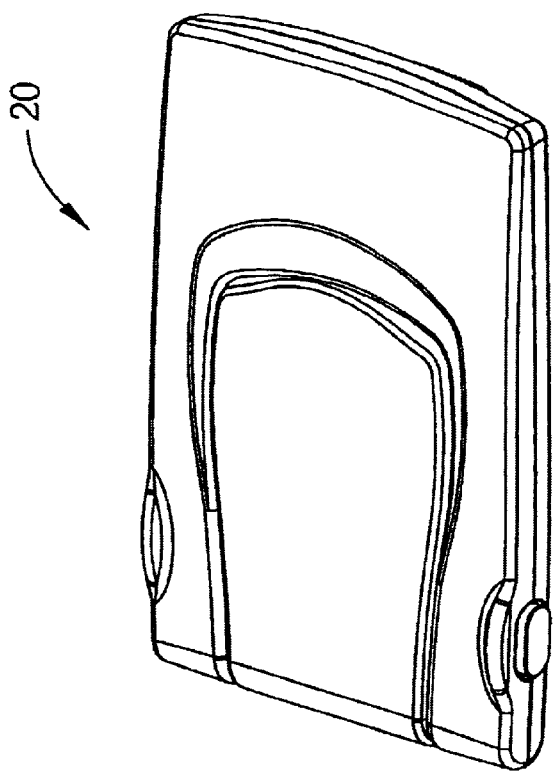
FIG. 2 is a three-dimensional drawing of a GPS module according to the present invention.
Figure 1F:
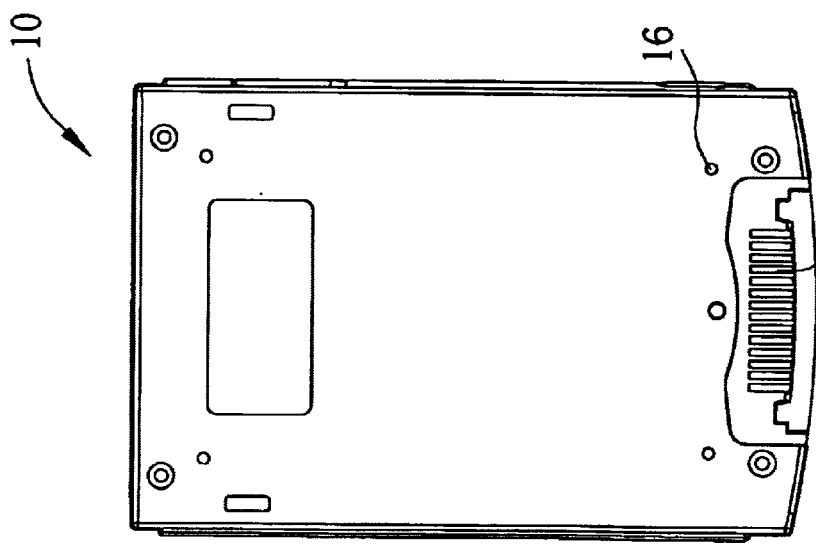
FIG. 1f is a back view of the PDA of FIG. 1.
Figure 2A:
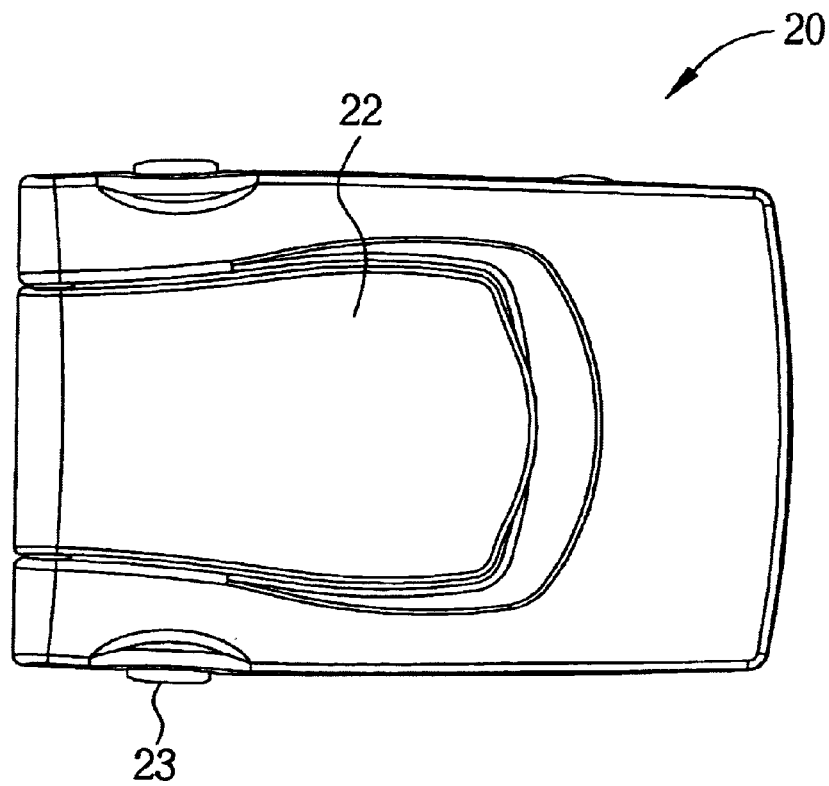
FIG. 2a is a front view of the GPS module of FIG. 2.
Figure 2B:
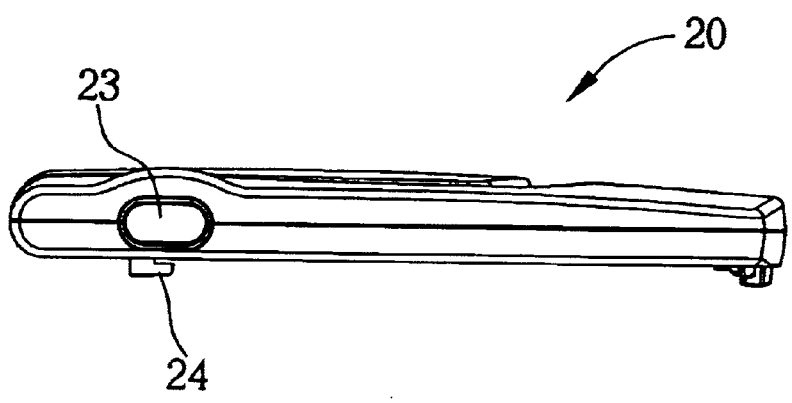
FIG. 2b is a top view of the GPS module of FIG. 2.
Figure 2C:
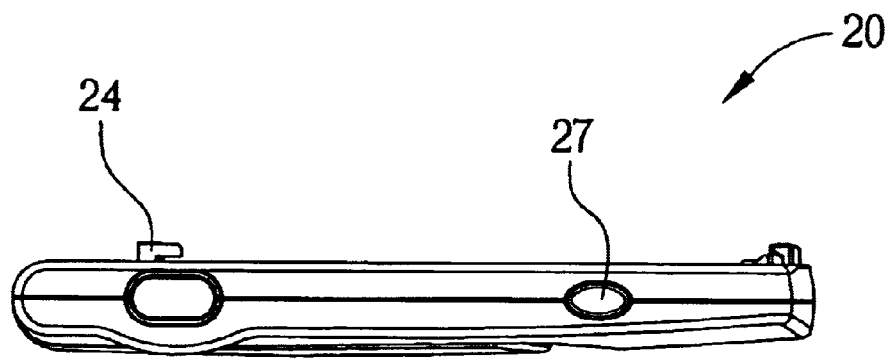
FIG. 2c is a bottom view of the GPS module of FIG. 2.
Figure 2D:
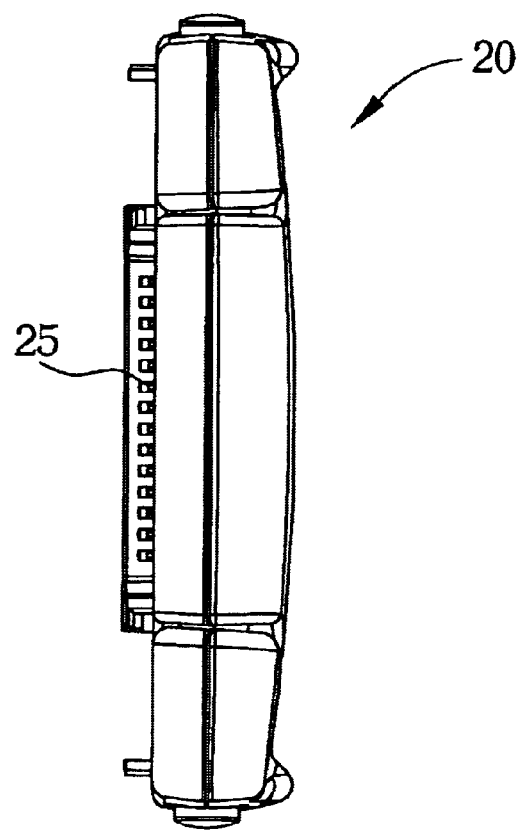
FIG. 2d is a left-hand-side view of the GPS module of FIG. 2.
Figure 2F:
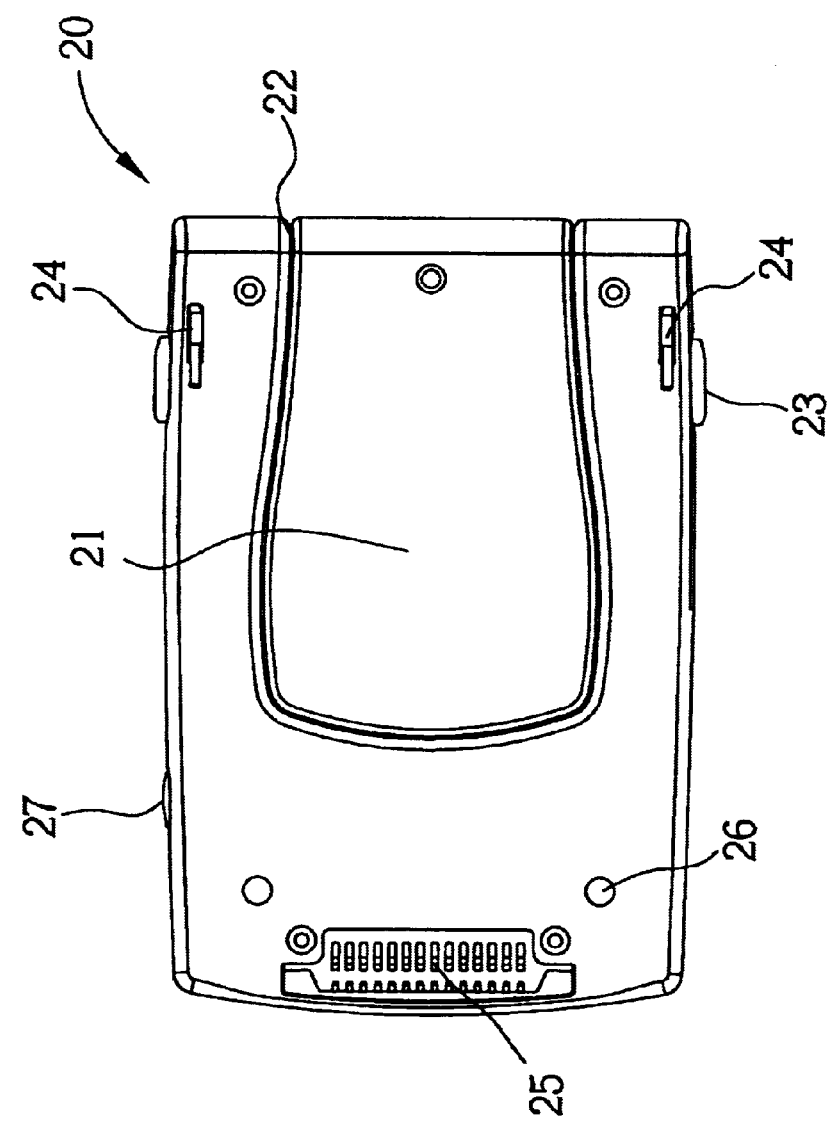
FIG. 2f is a back view of the GPS module of FIG. 2.
Figure 2E:
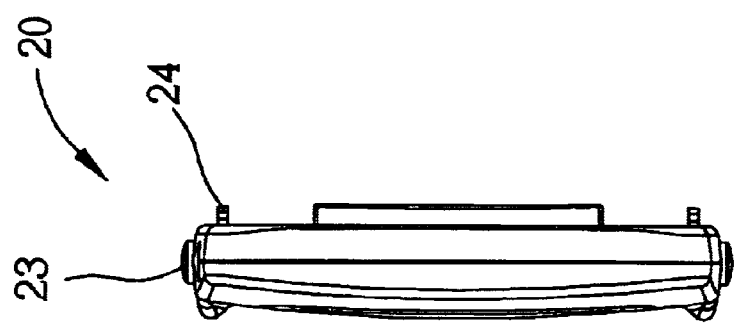
FIG. 2e is a right-hand-side view of the GPS module of FIG. 2.

FIG. 2 further illustrates a structure of the GPS module 20. It comprises a rotatable antenna 21, a hinge 22 which is connected to the antenna 21, release buttons 23 which are formed on both sides of the GPS module 20, a pair of hooks 24 which are mated with the engaging slots 14 of the PDA 10, a second connector 25 which is mated with the first connector 15 of the PDA 10, a positioning point 26, and a switch 27. Because the communication efficiency of GPS is related to its antenna's angle, the PDA 10 must comprise an apparatus to properly adjust the antenna 21 to perform its communication positioning function.

As shown in FIG. 2, the antenna 21 is connected to the GPS module 20 with the hinge 22 allowing it to be pivotally positioned. The antennas 21 angle can also be adjusted by altering the PDA's 10 position. The second connector 25, which has 14 pins, is connected with the first connector 15 for power and data transmission. The GPS module 20 can be turned on or off through the switch 27. Several positioning points 26 on the GPS module 20 are mated with the protrusions 16 disposed on the side of the PDA 10, so the GPS module 20 can be mounted correctly on the PDA 10. When the GPS module 20 is being mounted onto the PDA 10, the L-shaped movable hooks 24 will enter the engaging slots 14, fixing the GPS module 20 to the PDA 10.

Figure 4:
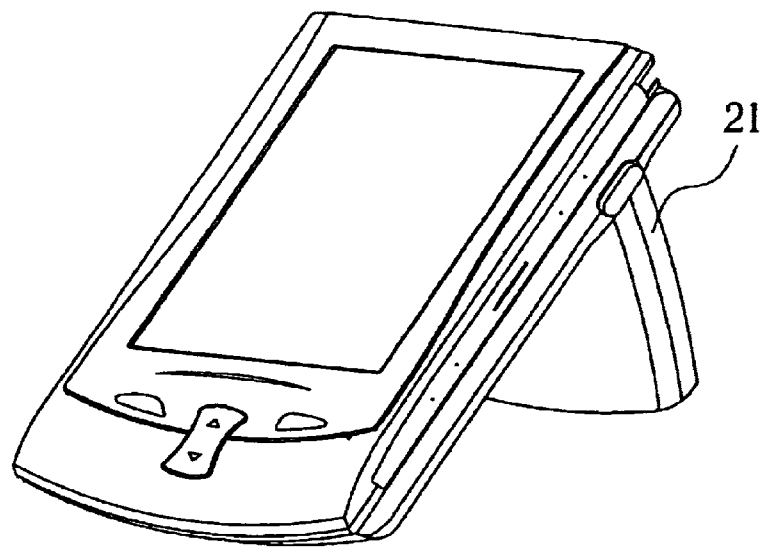
FIG. 4 is a three-dimensional drawing of a combination of the PDA of FIG. 1 and the GPS module of FIG. 2.
Figure 5:
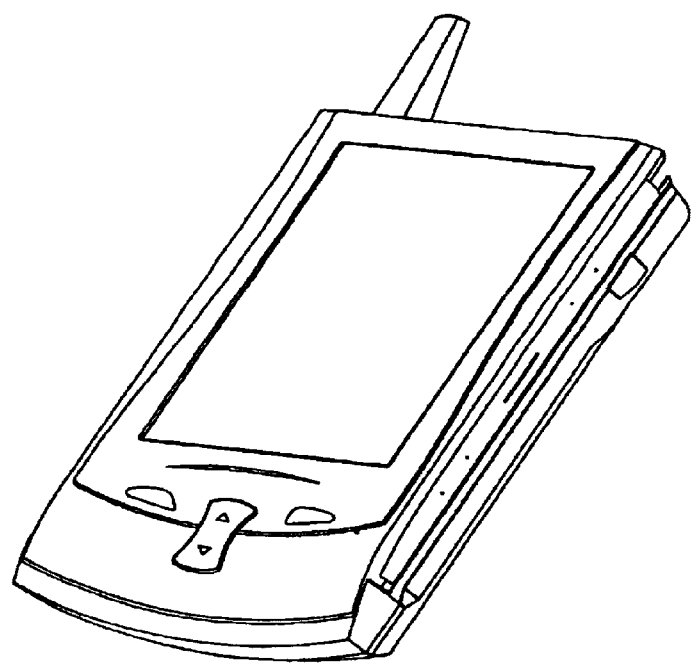
FIG. 5 is a three-dimensional drawing of a combination of the PDA of FIG. 1 and the cellular phone module of FIG. 3.

Please refer to FIG. 2 again. When users want to remove the GPS module 20 from the PDA 10, pushing the release buttons 23 will move the hooks 24 to a releasing position allowing easy removal of the GPS module 20 from the PDA 10. FIG. 4 illustrates the assembled state diagram of the present invention, where antenna's 21 rotating angle can be adjusted and set to a specific position according to the state of the PDA 10. Of course, the PDA's 10 operating system needs a built-in drive program or a plug-n-play model for the GPS module 20 to function.

Figure 3:
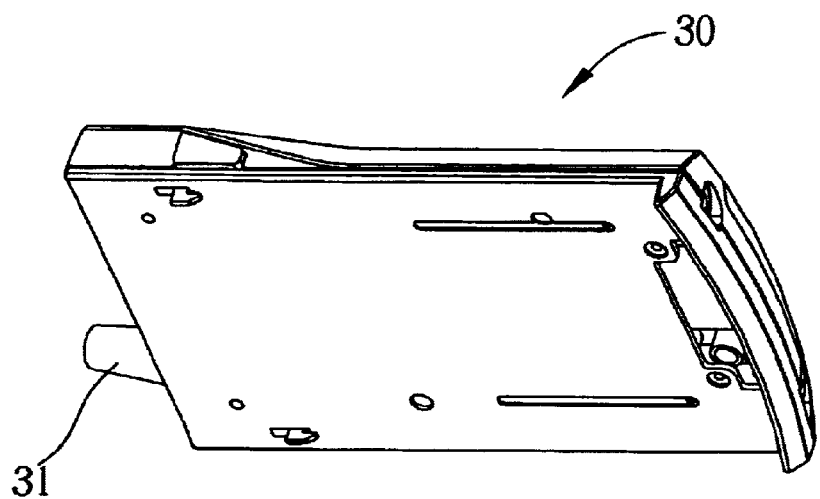
FIG. 3 is a three-dimensional drawing of a cellular phone module according to the present invention.
Figure 3A:
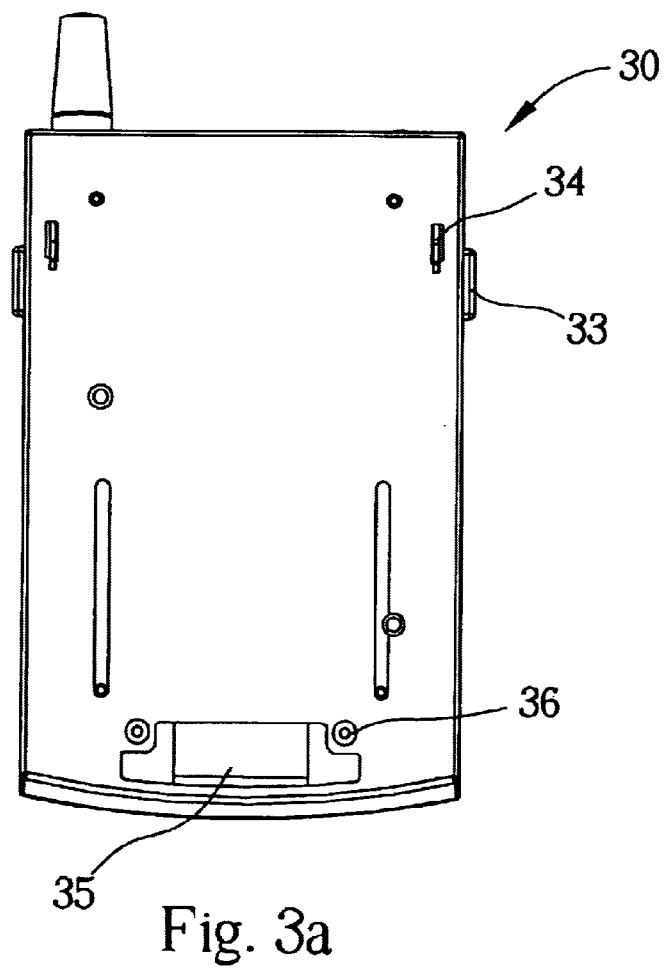
FIG. 3a is a front view of the cellular phone module of FIG. 3.
Figure 3B:
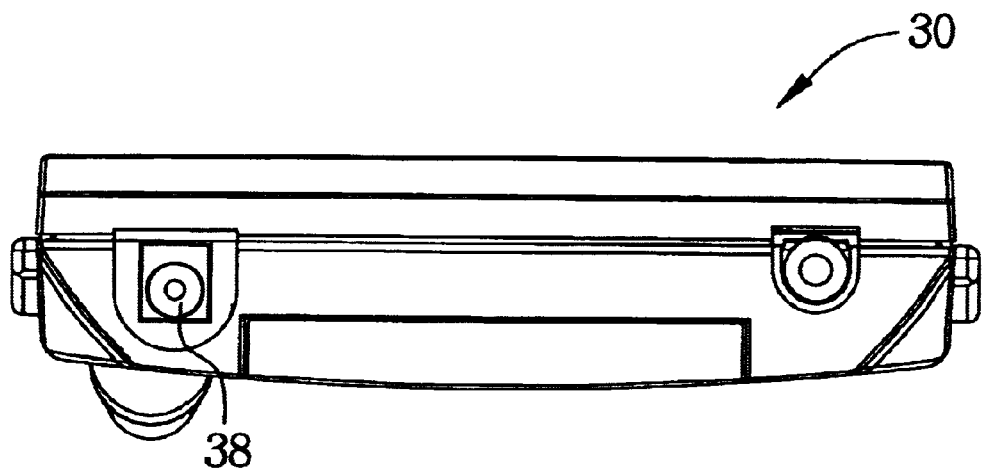
FIG. 3b is a top view of the cellular phone module of FIG. 3.
Figure 3C:
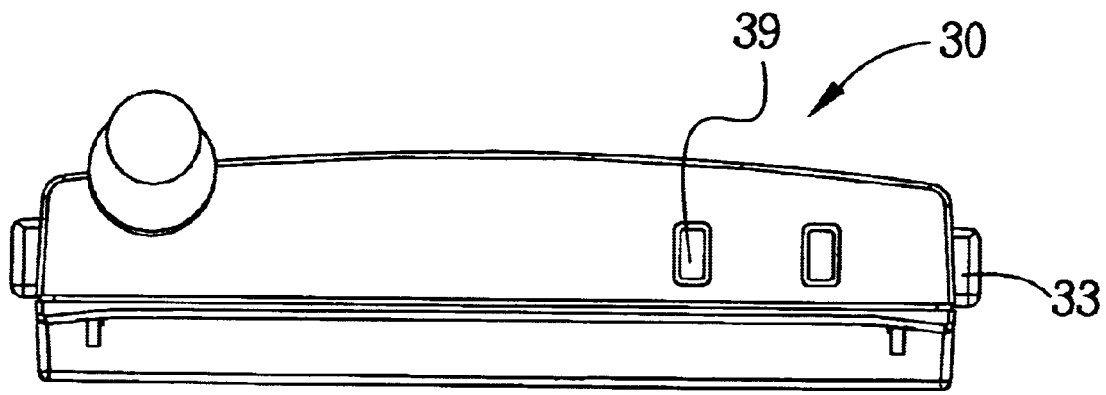
FIG. 3c is a bottom view of the cellular phone module of FIG. 3.
Figure 3E:
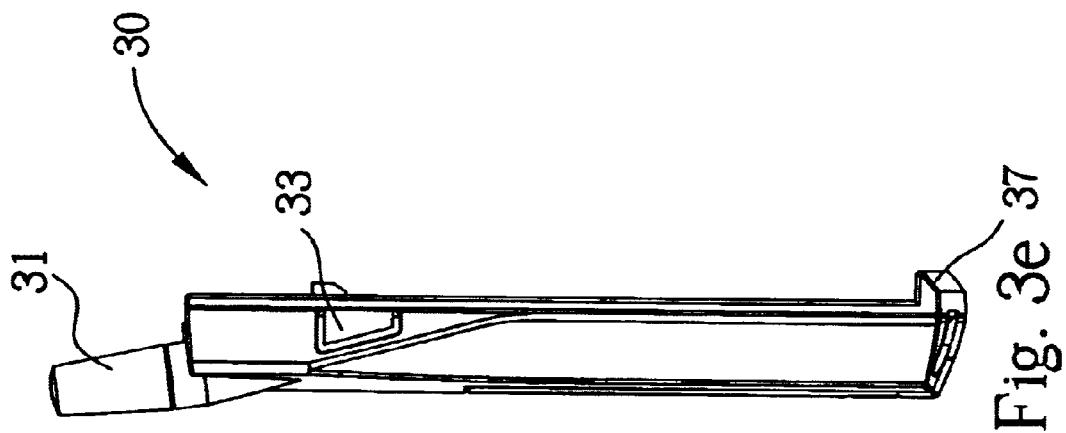
FIG. 3e is a right-hand-side view of the cellular phone module of FIG. 3.
Figure 3D:
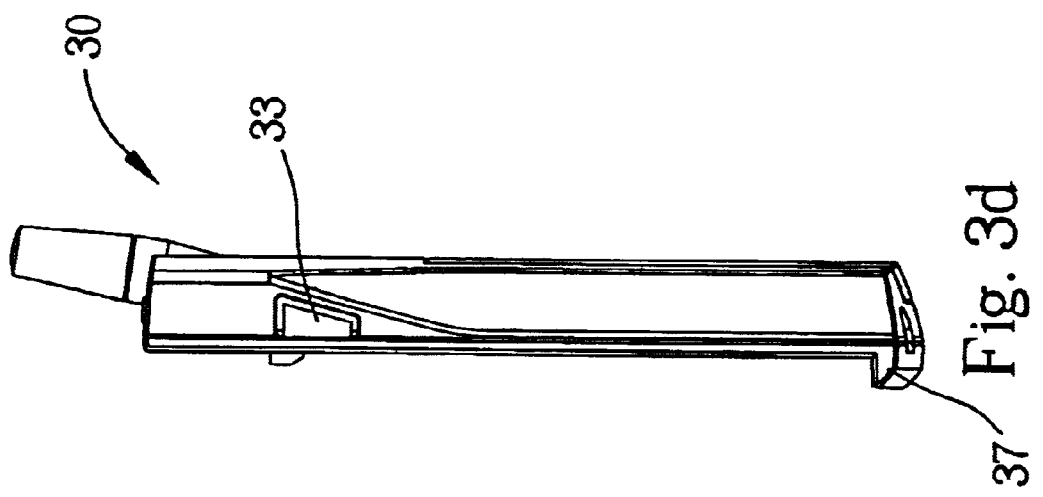
FIG. 3d is a left-hand-side view of the cellular phone module of FIG. 3.
Figure 3F:
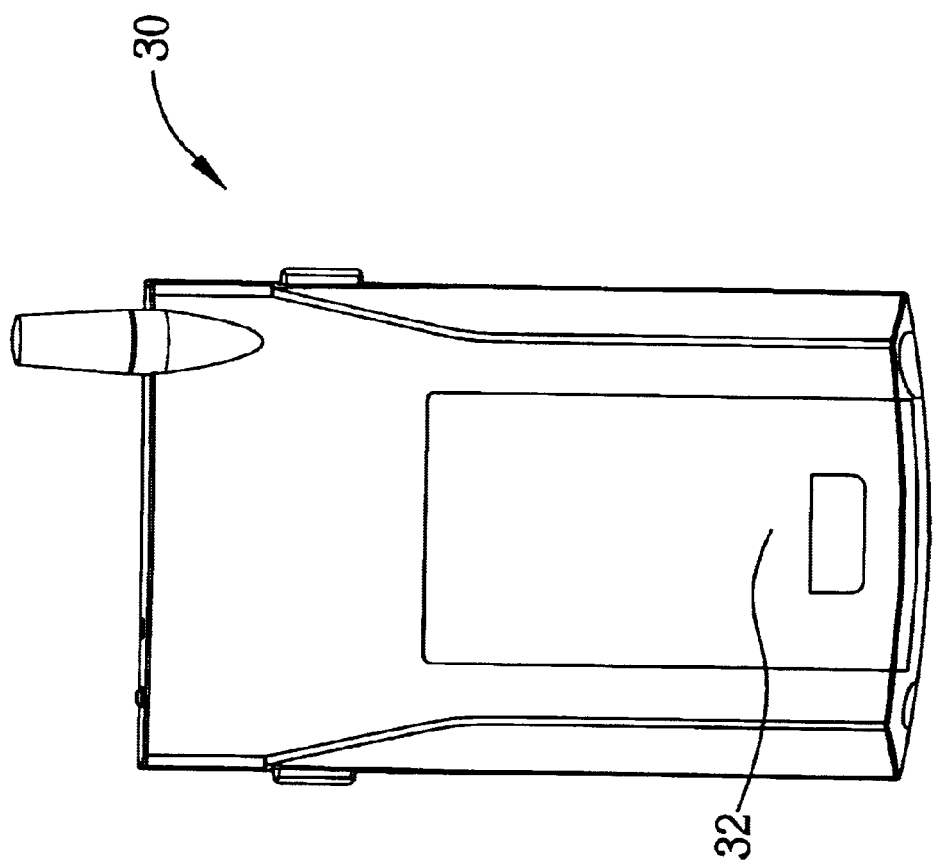
FIG. 3f is a back view of the cellular phone module of FIG. 3.

FIG. 3 shows a structure of a cellular phone module 30. It comprises an antenna 31, a battery 32, release buttons 33 which are formed on both sides of the cellular phone module 30, a pair of hooks 34 which are mated with the engaging slots 14, a second connector 35 which is mated with the first connector 15, a positioning point 36, a chassis 37, a charging slot 38, and a microphone 39. The most obvious difference between the cellular phone module 30 and a conventional cellular phone is that the cellular phone module 30 does not comprise buttons and an LCD panel. Therefore, the cellular phone module 30 cannot perform cellular phone functions until connected with the PDA 10. Then a PDA's 10 built-in drive program will start the cellular phone module 30 and the data can be input through the operating buttons 12 or the LCD panel 11 by manipulating the handpen. The antenna 31, the battery 32, the charging slot 38, and the microphone 39 all perform the same functions as those in a conventional cellular phone. A SIM card for the cellular phone can also be installed in the same place as that of the battery 32.

Please refer to FIG. 3 again. The cellular phone module's 30 second connector 35 has 14 pins and is connected with the first connector 15 for power and data transmission. Several positioning points 36 on the cellular phone module 30 are mated with the protrusions 16 disposed on the back of the PDA 10, so the cellular phone module 30 can be mounted correctly on the PDA 10. Additionally, when the cellular phone module 30 is mounted on the PDA 10, the L-shaped movable hooks 34 will enter the engaging slots 14 and the cellular phone module 30 will fix to the PDA 10. It is worthwhile to notice that the cellular phone module 30 also comprises a chassis 37 that is almost perpendicular to the cellular phone modules 30 main frame, and is used to cradle the PDA 10. Thus the cellular phone module 30 will combine with the PDA 10 more completely and the user will feel the combination easier to operate. Of course, any function of a WAP cellular phone can be performed on the PDA's 10 LCD panel 11. When the cellular phone module 30 is plugged into the PDA 10, the drive program will start the cellular phone modules 30 cellular phone functions and display a communication service system on the LCD panel 11. To remove the cellular phone module 30 from the PDA 10, push the release buttons 33 moving the hooks 34 to a releasing position, and disassemble the cellular phone module 30 from the PDA 10. Of course, the PDA's 10 operating system needs a built-in drive program or a plug-n-play model to start the cellular phone module 30 functioning. FIG. 6 illustrates the assembled state diagram of the present invention. The combination of the PDA 10 and the cellular phone module 30 functions exactly the same as a cellular phone. That is to say, the user can dial by touching the communication service system's buttons on the LCD panel with the handpen.

In contrast with the prior art, the present invention can provide a PDA with more communication functions so that the problems of extend-ability for peripheral equipment and the short usage range due to the lack of communication ability will be solved. According to the above paragraphs, the present invention has many superior characteristics and also solves the prior arts drawbacks and inconveniences in the field.

Following the detailed description of the present invention above, those skilled in the art will readily observe that numerous modifications and alterations of the device may be made while retaining the teachings of the invention. For example, the other end of the cellular phone module 30 can form a first connector 15 to connect with the GPS module 20. Thus, the PDA 10 can use the communication functions of the cellular phone and the GPS at the same time. Accordingly, the above disclosure should be construed as limited only by the metes and bounds of the appended claims.

What is claimed is:

1. A personal digital assistant (PDA) for selectively connecting with a communications module, comprising:

a first housing having a liquid crystal display (LCD) panel formed on a first side of the first housing for displaying data;

a first engaging means formed on a second side of the first housing; and a first connector disposed at one end of the first housing for transmitting power and data;

wherein the selectively communications module further comprises:
a second housing;
a second engaging means formed on the second housing for engaging with the first engaging means; and
a second connector disposed at one end of the second housing for connecting with the first connector so as to transmit data.

2. The PDA of claim 1 wherein the first engaging means is a slot, the second engaging means being a hook for engaging with the slot, the communications module further comprising a releasing button which is capable of being switched to release the hook from the slot.

3. The PDA of claim 1 further comprising a plurality of protrusions formed on the second side of the first housing, the communications module further comprising a plurality of apertures for mating with the protrusions.

4. The PDA of claim 1 wherein the first connector has 14 holes, the second connector having 14 pins for mating with the 14 holes.

5. The PDA of claim 1 wherein the communications module further comprises a switch for turning on or off the communications module.

6. A personal digital assistant (PDA) for selectively connecting with a global positioning system (GPS) module, the PDA comprising:
a first housing having a liquid crystal display (LCD) panel formed on a first side of the first housing for displaying data;
a first engaging means formed on a second side of the first housing; and
a first connector disposed at one end of the first housing for transmitting power and data;
wherein the GPS module further comprises:
a second housing;
an antenna rotatably fixed on the second housing;
a second engaging means formed on the second housing for engaging with the first engaging means; and
a second connector disposed at one end of the second housing for connecting with the first connector so as to transmit data.

7. The PDA of claim 6 wherein the first engaging means is a slot, the second engaging means being a hook for engaging with the slot, the GPS module further comprising a releasing button which is capable of being switched to release the hook from the slot.

8. The PDA of claim 6 further comprising a plurality of protrusions formed on the second side of the first housing, the GPS module further comprising a plurality of apertures for mating with the protrusions.

9. The PDA of claim 6 wherein the first connector has 14 holes, the second connector having 14 pins for mating with the 14 holes.

10. The PDA of claim 6 wherein the GPS module further comprises a switch for turning on or off the GPS module.

11. The PDA of claim 6 wherein the GPS module further comprises a hinge for rotatably fixing the antenna on the second housing.

12. A personal digital assistant (PDA) for selectively connecting with a cellular phone module, the PDA comprising:
a first housing having a liquid crystal display (LCD) panel formed on a first side of the first housing for displaying data;
a first engaging means formed on a second side of the first housing; and
a first connector disposed at one end of the first housing for transmitting power and data;
wherein the cellular phone module further comprises:
a second housing;
an antenna for transmitting and receiving radio frequency signals;
a battery for supplying power to the cellular phone module;
a microphone for inputting sound signals;
a second engaging means formed on the second housing for engaging with the first engaging means; and
a second connector disposed at one end of the second housing for connecting with the first connector so as to transmit data.

13. The PDA of claim 12 wherein the cellular phone module further comprises a chassis connected to the second housing.

14. The PDA of claim 12 wherein the first engaging means is a slot, the second engaging means being a hook for engaging with the slot, the cellular phone module further comprising a releasing button which is capable of being switched to release the hook from the slot.

15. The PDA of claim 12 further comprising a plurality of protrusions formed on the second side of the first housing, the cellular phone module further comprising a plurality of apertures for mating with the protrusions.

16. The PDA of claim 12 wherein the first connector has 14 holes, the second connector having 14 pins for mating with the 14 holes.

17. The PDA of claim 12 wherein the cellular phone module further comprises a switch for turning on or off the cellular phone module.

* * * * *